[11] 3,611,293

| | | | |
|---|---|---|---|
| 3,407,387 | 10/1968 | Looschen et al. | 340/152 |
| 3,445,633 | 5/1969 | Ratner | 235/61.76 |
| 3,513,298 | 5/1970 | Riddle et al. | 340/149 |
| 3,308,439 | 3/1967 | Tink et al. | 340/172.5 |

*Primary Examiner*—Donald J. Yusko
*Attorneys*—William D. Hall, Elliott I. Pollock, Fred C. Philpitt, George Vande Sande, Charles F. Steininger and Robert R. Priddy

[72] Inventors Geoffrey Ernest Patrick Constable;
Dennis Arthur Lloyd, both of Cheltenham, England
[21] Appl. No. 851,187
[22] Filed Aug. 19, 1969
[45] Patented Oct. 5, 1971
[73] Assignee Smiths Industries Limited
London, England
[32] Priority Aug. 30, 1968
[33] Great Britain
[31] 41425/68

[54] ACCESS-CONTROL EQUIPMENT AND ITEM-DISPENSING SYSTEMS INCLUDING SUCH EQUIPMENT
14 Claims, 6 Drawing Figs.
[52] U.S. Cl. ............................................. 340/149 A, 235/61.7 B
[51] Int. Cl. ............................................. H04q 5/16
[50] Field of Search ............................................. 340/149, 152, 172.5; 235/61.6, 61.7, 61.7 B, 61.9, 61.11

[56] References Cited
UNITED STATES PATENTS

| 3,039,582 | 6/1962 | Simjian | 235/61.7 B |
|---|---|---|---|
| 3,061,143 | 10/1962 | Simjian | 235/61.7 B |
| 3,200,380 | 8/1965 | MacDonald | 340/172.5 |
| 3,401,830 | 9/1968 | Mathews | 235/61.7 B |

ABSTRACT: A money-dispensing system is operative to dispense money in response to a bank customer's embossed credit card and keyed entry of his personal identification number at a terminal station, only if this number accords with the customer's account number as read from an accounting record impressed from the card. Both numbers are transmitted in binary-coded form via a data link to the bank's central computer to check their accord with one another, the card validity and the customer's credit, using stored information there. If the checks are satisfied, approval for dispensing is given to the terminal station by transmission over the data link of an encyphered number that is specially generated in a binary shift register at the computer using a programmed series of shifts with intervening feedback into the register of digits derived from a programmed summation of the contents of individual register stages. The same number is generated independently using the same program in a shift register at the terminal station, and is compared for equality with the number received over the data link to recognize this as approval for the dispensing operation.

PATENTED OCT 5 1971 3,611,293

INVENTORS:
G.E.P. CONSTABLE of
D.A. LLOYD
BY: Elliot Pollock
ATTORNEY.

FIG. 3.

ACCESS-CONTROL EQUIPMENT AND ITEM-DISPENSING SYSTEMS INCLUDING SUCH EQUIPMENT

This invention relates to access-control equipment and item-dispensing systems including such equipment.

According to the present invention, access-control equipment for selectively enabling access to a facility, comprises first and second stations spaced apart from one another, said first station including access means operable to enable access to said facility, means for receiving a request for access, and means for transmitting information in respect of the request to said second station, and said second station including encyphering means operative to derive an encyphered word by execution of a predetermined word-deriving program and approval means operative in dependence upon the information transmitted from said first station to transmit to said first station a signal in accordance with the encyphered word so as thereby to signify approval of the request for access, and wherein said first station further includes word-deriving means operative to execute said predetermined word-deriving program at said first station for deriving the same word as derived by said encyphering means, means for operating said access means in dependence upon recognition of the approval signal received from said second station, recognition of the approval signal in this respect being dependent upon the detection of a predetermined correspondence between the encyphered word of the approval signal and the word derived by said word-deriving means.

The use of an encyphered word to signify approval is of advantage in respect of the security of the arrangement, in that any attempt at fraudulent access based on transmission of a simulated 'approval' signal to the first station, requires preknowledge of the encyphering necessary for recognition to take place at that station. The programmed derivation of corresponding words separately at the two stations readily allows for change to be made in the signal transmitted as between successive requests for access. Such change reduces the risk of access being gained fraudulently using recordings of an authentic 'approval' signal. It is possible to effect the change by arranging that execution of the word-deriving program essentially involves use of a cypher or key word, and that the system includes means responsive to each said request for access to select a fresh cypher for use in respect of that request, and means for conveying the selected cypher to both said encyphering means and word-deriving means for use therein in the execution of the word-deriving program. Also in this respect it may be arranged that the word-deriving program is executed at both stations to involve a randomly derived number communicated from one station to the other. Additionally, or alternatively, the program may be executed at both stations to involve a part at least of the information transmitted from the first to second stations.

The request for access may involve the presentation to the equipment of an information-bearing token and in these circumstances the first station may include means for deriving a plural character word from the information borne by the token and for transmitting this token-derived word to the second station. The first station may in these circumstances further include manually operable means for entering into the equipment a plural character word as another part of the request for access, the particular word entered being dependent upon manual selection and being also transmitted to the second station. The approval means at the second station may in these circumstances comprise comparison means responsive to the transmitted manually entered word and token-derived word to detect whether a predetermined correspondence exists between them, and means operative to transmit the approval signal to the first station only in the event that existence of this predetermined correspondence is detected by the comparison means.

The encyphering means at the second station and the word-deriving means at the first station may each include a multistage shift register, and a feedback arrangement controllable to operate in any selected one of a plurality of different configurations to provide feedback to the shift register dependent upon the configuration selected, so that the shift register in response to the feedback provided generates a numerical code sequence dependent upon the selected configuration of the feedback arrangement. The word derivation in these circumstances effected by the individual encyphering means and word-deriving means may involve simply an appropriate selection of a number from the code sequence generated by its respective shift register.

The access-control equipment may be arranged to enable selectively, access to any form of facility, for example, entry to a restricted area, use of a service, or withdrawal of an item or product (in predetermined or selected quantity). One particular application of the equipment is in the field of banking where a money-dispensing system is provided for use by customers at all times, the customers being issued with individual tokens for presentation to any one of a plurality of money-dispensing terminals of the system when withdrawal of money is required. The equipment of the present invention in this latter connection may be used in the control of a money-dispenser, so that money (for example, in banknote form) is dispensed to the customer in response to each valid 'request' for withdrawal. A valid 'request' in this context may involve the presentation to the equipment of a token (for example, a punched or embossed card), information borne by the token and read out therefrom at said first station being transmitted to said second station as aforesaid.

According to a feature of the invention an item-dispensing system comprises two spaced stations, a first of said stations including token-reading means for receiving an information-bearing token and reading out information borne thereby, means that is operable manually for entering a number into the system, the particular number entered being dependent upon manual selection, means for transmitting to said second station the manually entered number and information read out by said token-reading means, and item-dispensing means that is selectively operable to dispense from a reserve of items at least one such item upon each operation of the item-dispensing means, and said second station including comparison means responsive to the said number and information transmitted from the first station for comparing said number with a number dependent upon said information to detect whether a predetermined correspondence exists between the two numbers, encyphering means for executing a predetermined program to derive a plural digit number, and means for transmitting said plural digit number to said first station, so as to provide a signal signifying approval of operation of the item-dispensing means, only in the event that the existence of said predetermined correspondence is detected by said comparison means, and wherein said first station also includes number-deriving means for executing said predetermined program to derive at said first station the same plural digit number as derived by the encyphering means at said second station, and means for operating the item-dispensing means in response to equality between the plural digit number transmitted from the second station and the plural digit number derived at said first station. An item-dispensing system in accordance with the present invention will now be described, by way of example, with reference to the accompanying drawings in which:

The system to be described is for use in dispensing packets of bank notes, one at a time, to customers of a bank, and is for use after, as well as during, normal banking hours. The customers authorized to use the system are each issued with a coded token in the form of a plastic card that may be used generally as a credit card. Each card bears a date of expiry and numerical information identifying the account of the customer to whom the card has been issued, and this information, as well as being embossed directly on the card, is embossed thereon in coded from. The customer is informed of a secret, personal identification number that is individual to his account but cannot be deduced from the card itself. When the customer wishes to withdraw a packet of bank notes, he simply presents his card to a card-reception unit of the system at a branch of the bank, and operates a set of 10 pushbuttons in accordance with his personal identification number. The system records the information from the card for accounting and auditing purposes, and in return automatically dispenses to the customer one packet of bank notes. The packet of bank notes is dispensed to the customer from a dispenser that is individually associated with the card-reception unit and holds a supply of such packets, the dispenser being released to dispense the packet only after the validity of the transaction has been checked. In this respect the system checks the authenticity of the card, and then that the number entered manually by the customer is the number appropriate to the account identified by the card, that the card is still in force, and that the customer's account can accommodate the withdrawal. These latter checks are carried out at a central station or 'computer center' that is common to a series of 'terminals' that each involve a card-reception unit and associated dispenser; the terminals may readily be located at different, widely spaced branches of the bank.

Information relating to the status of account of each bank customer issued with a card, is stored at the computer center together with the secret personal identification numbers appropriate to these accounts. Communication between the computer center and the card-reception units at the different terminals is made by means of binary-coded signals transmitted via a conventional form of data link. Generally speaking the encoding of the signals transmitted over the data link in respect of any transaction is conventional, there being special steps taken for security purposes to encypher one signal only, namely, a signal that is transmitted from the computer center to the relevant terminal in order to signify approval of release of the dispenser to dispense a packet of bank notes.

When a customer at any terminal is dispensed a packet of bank notes, his account as recorded at the computer center is debited with the amount of the withdrawal. The card-reception unit at the terminal then acts to return the card to the customer for further use as desired. The card used is not returned (and no dispensing of course takes place), however, in the event that is it is not authentic, or has expired or is otherwise invalid; in each of these circumstances the card is retained within the card-reception unit and is than recoverable by bank officials only. The form of authentic card issued to bank customers is shown in FIG. 1.

Figure 1:
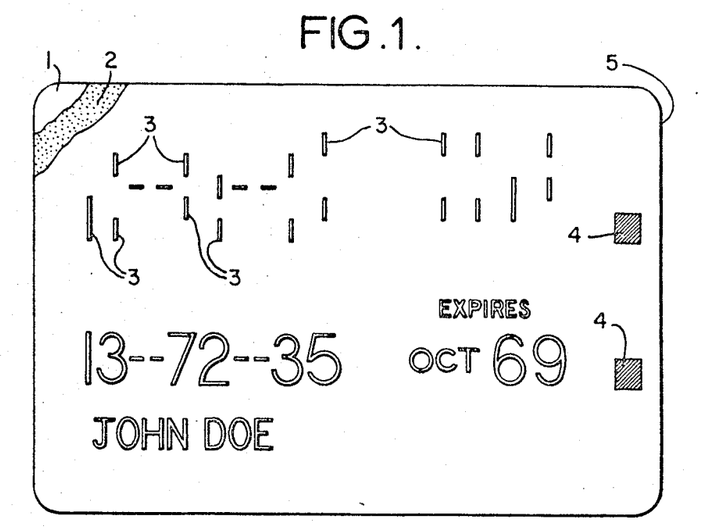
FIG. 1 shows the form of a coded token used with the item-dispensing system.

Referring to FIG. 1, each card is formed by a rectangular substrate 1 of opaque plastic material that is shielded on either face by transparent vinyl film. The card, which carries a magnetic coating 2 beneath printing and other artwork on its obverse face (shown in FIG. 1), is embossed with the customer's name and account number and with the date of expiry of the card. The account number and date of expiry are also encoded on the card using bar-characters 3 that are embossed on the substrate 1 in a two-out-of-five positional code, these characters together with the characters of the other embossings all protruding from the obverse face of the card. Two small dark markings 4 are provided at spaced intervals from one another across the width of the card at a designated leading end 5, these like the magnetic coating 2, being provided for security purposes.

The magnetic coating 2 on the card involves two magnetic oxides of high- and low-coercivity respectively, the magnetic oxides being provided either in separate layers, with the layer of high-coercivity material extending in a band across the width of the substrate 1 beneath the other layer, or as an admixture of the two materials. A series of pulses is recorded in the high-coercivity material, the individual pulse-recordings being made at positions within the coating 2 spaced from one another lengthwise of the card. For security purposes, the low-coercivity material carries a magnetic recording that extends over substantially the whole area of the coating 2 and serves to provide 'noise' masking the pulse-recordings from easy detection.

The authenticity of each card presented to the system is checked, firstly by detecting whether the card has appropriately located markings 4, and then by detecting whether it carries an appropriate series of pulse-recordings in the coating 2. These checks are performed by the card-reception unit represented in FIG. 2.

Figure 2:
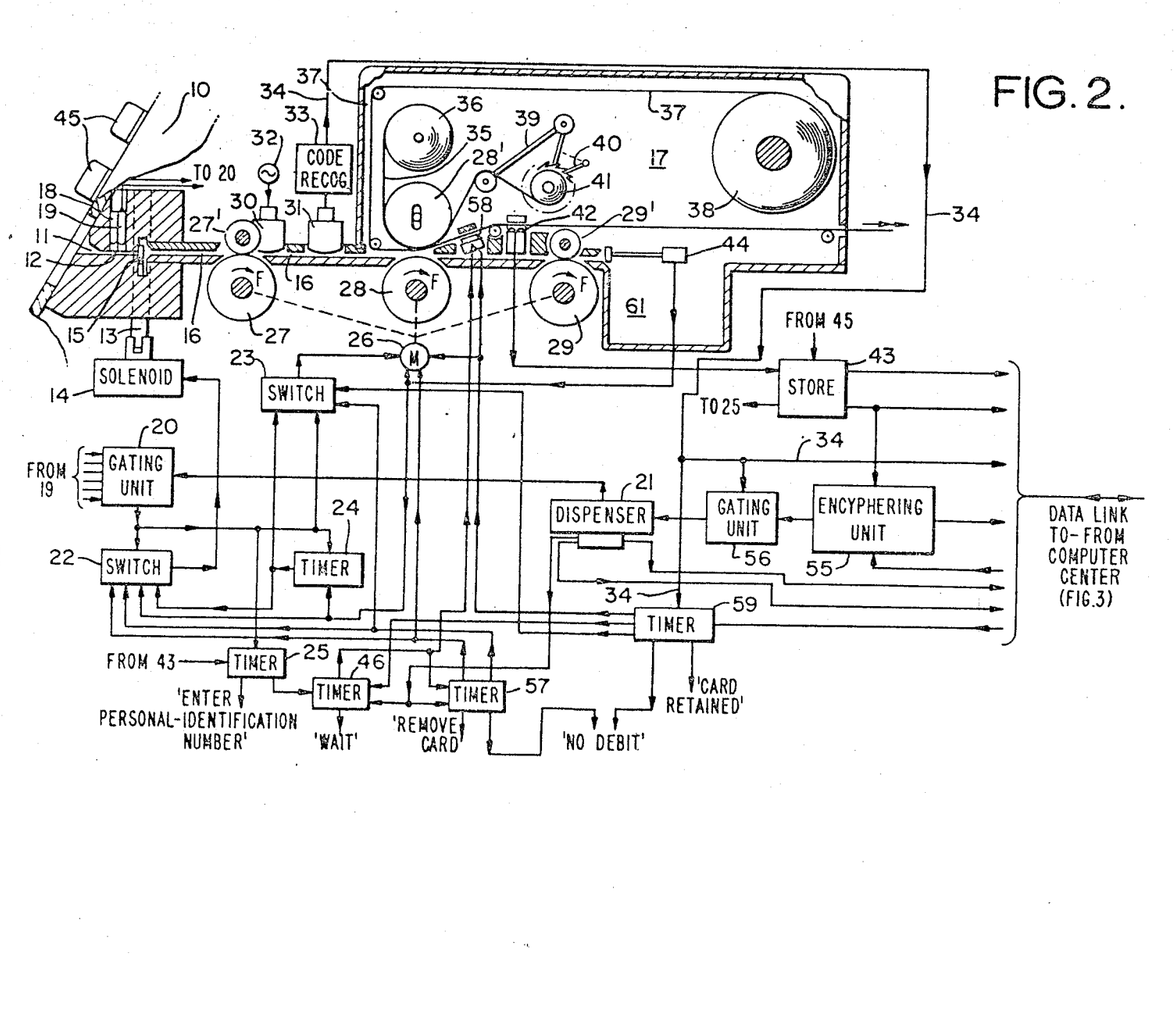
FIG. 2 is a schematic representation of part of the item-dispensing system used for receiving and selectively admitting coded tokens to the system.

Referring to FIG. 2, the card-reception unit has a facia 10 that is mounted in an external wall of the bank, and has a readily accessible mouth 11 for receiving the customer's card. The mouth 11 within the unit converges to a throat portion 12 that is normally blocked at its far end by a movable shutter 13. An electrical solenoid 14 controls the shutter 13, the solenoid 14 when energized moving the shutter 13 upwardly against a spring-bias to bring a gate-aperture 15 through the shutter 13, into alignment with the throat portion 12. This opens the way for the card to pass through the portion 12 into a guideway 16 that leads to a card-reading cassette 17. The shutter 13 remains in this open position only so long as the solenoid 14 is energized, and is otherwise returned and held by the spring-bias in the closed position in which the way into the guideway 16 is completely blocked.

The customer presents his card to the card-reception unit by inserting the end 5 into the exposed mouth 11 with the coating 2 uppermost. The end 5 is inserted through the mouth 11 into the throat portion 12 to abut the closed shutter 13. In this position of the card the set of markings 4 lie beneath lamps 18 (of which only one is shown) that are continuously energized to direct light downwardly across the throat portion 12 for reflection back to individual photoelectric cells 19. The photoelectric cells 19 (of which only one is shown) are disposed at spaced intervals from one another across the width of the throat portion 12, and, until a card is inserted in the throat portion 12, each cell 19 receives light from its associated lamp 18 and in response thereto supplies an electric signal to an electrical gating unit 20.

The unit 20 is responsive only to the condition in which signals are supplied by a certain combination of the photoelectric cells 19 and not by the remainder. This condition exists only when a card with the corresponding number of appropriately located markings 4 is presented to the card-reception unit with the end 5 leading and with the coating 2 uppermost, reflection of light to those of the cells 19 that are in register with the markings 4 being interrupted, and to the remainder continuing by virtue of the absence of markings 4 elsewhere across the width. Response of the gating unit 20 to this condition is, however, effective to produce an output signal from the unit 20 only in the circumstances in which an enabling signal is supplied to the unit 20 from the dispenser 21 of the terminal. The dispenser 21 supplies the enabling signal to the unit 20 only so long as there is still a packet of bank notes available therein. If no enabling signal is supplied from the dispenser 21, there is no output signal from the unit 20, and an EMPTY sign (not shown) on the facia 10 of the card-reception unit is illuminated. The EMPTY sign is illuminated (by means not shown) throughout any period for which the enabling signal is not supplied by the dispenser 21, so as to warn customers that the system is not operative. The absence of the enabling signal from the dispenser 21 has the effect of inhibiting operation of the whole system, since the system is then incapable of responding even when presented with an authentic card.

When there is response of the unit 20 in the presence of the enabling signal from the dispenser 21, the output signal supplied by the unit 20 is passed to switch ON a switch unit 22 that controls the supply of electrical energization current to the solenoid 14. The output signal is also supplied to switch ON a switch unit 23, and to start operation of two timers 24 and 25. The switch unit 23 controls the supply of electrical energization current to a reversible electric motor 26 that drives three card-transport rollers 27 to 29 that project into the guideway 16 at spaced intervals therealong. The switching ON of the units 22 and 23 serves to energize both the solenoid 14 and the motor 26, with the result that the shutter 13 moves upwardly to admit the card through the gate-aperture 15 into the guideway 16, and the rollers 27 to 29 rotate in their forward senses indicated by the arrows F. The card admitted through the gate-aperture 15 is fed by the customer into the guideway 16 until the leading end 5 reaches the rotating roller 27. An idling roller 27' is urged resiliently and downwardly into contact with the roller 27 so that when the end 5 reaches the roller 27 the card is drawn lengthwise completely into the card-reception unit. The card is drawn in between the rollers 27 and 27' to be fed along the guideway 16 towards the rotating roller 28. The end 5 eventually enters between the roller 28 and an associated pinch roller 28' at the entrance to the reading cassette 17. The card is accordingly drawn lengthwise from the rollers 27 and 27' and is passed further on along the guideway 16 towards the rotating roller 29 positioned at the far end of the cassette 17.

The card, in its passage along the guideway 16 from the roller 27 to the roller 28, passes successively beneath a magnetic-recording head 30 and a magnetic-reading head 31 that both project into the guideway 16. The head 30 is energized with alternating current that is supplied from a source 32 to erase the 'noise' which in an authentic card is recorded over the pulse-recordings in the coating 2. The frequency and amplitude of this alternating current are so chosen that the magnetic flux produced by the head 30 is well capable of erasing the *noise' recorded in the low-coercivity material, but is nonetheless insufficient to affect the pulse-recordings recorded in the high-coercivity material.*

The erasure of the 'noise' masking the pulse-recordings enables these recordings to be read in turn from the coating 2 by the head 31 as the card is fed lengthwise from the rollers 27 and 27'. The sensed pulse-recordings give rise to a series of pulse signals which are passed from the head 31 to be counted by a code-recognition unit 33. The unit 33 detects whether the number of pulse signals counted is the same as the number of pulse-recordings provided on each authentic card, and then only if it is, provides on a lead 34 an output signal indicative of this fact. This output signal, the existence of which is an essential for release of the dispenser 21 to dispense a packet of banknotes, persists after the card has passed on to the roller 28 and until the unit 33 is eventually reset.

The card in being driven by the rollers 27 and 27' to the roller 28 actuates a microswitch and this serves to energize a solenoid that acts via an operating fork (the microswitch, solenoid and fork are not shown) to lower the pinch roller 28' downwardly as the end 5 of the card reaches the roller 28 at the entrance to the cassette 17. The roller 28' is in this way pressed downwardly on to an inked (Mylar) ribbon 35 that is fed from a supply spool 36 to pass between the roller 28' and a paper tape 37. The tape 37, which is fed within the cassette 17 from a supply spool 38, is pressed under the ribbon 35 against the obverse face of the card in the guideway 16. As the card is drawn lengthwise through the rollers 28 and 28' with the ribbon 35 and tape 37, so the tape 37 is imprinted in the ink with the embossings of the card. The length of ribbon 35 passed is taken up by a sprung arm 39 the pivoting of which operates a ratchet 40 to cause a very small fraction of this length to be wound on a takeup spool 41, the remainder returning to the spool 36 for use again, when the roller 28' is subsequently lifted (as referred to later). The paper tape 37 imprinted with the embossings of the card, on the other hand, passes out from the cassette 17 via a photoelectric reader banknotes, that reads from the tape 37 the imprint made by the bar-characters 3 and supplies signals in accordance with the encoded account number and expiry date to a store 43.

The leading end 5 of the card driven from between the rollers 28 and 28', enters between the rotating roller 29 and an associated idling roller 29' that is urged downwardly and resiliently onto the roller 29. On passing from between the rollers 29 and 29' the end 5 actuates a microswitch 44 and thereby causes an electric signal to be supplied to switch OFF the unit 22 and to terminate operation of the timer 24. The switching OFF of the unit 22 breaks the supply of energization current to the solenoid 14 with the result that the shutter 13 closes. The timer 24 is arranged to supply a signal to the unit 22 to have the same effect as this, in the event that a preset period of operation of the timer 24 expires before receipt of the signal from the microswitch 44. In this latter respect, the timer 24 is preset to run for a period adequate to allow the card to be transported along the guideway 16 into the card-reading cassette 17. Operation of the timer 24 to run for this period is started, as referred to above, by the output signal from the gating unit 20 immediately preceding admission of the card to the guideway 16. If within this period there is no signal from the microswitch 44 (that is to say, if there is no signal to signify that the card has fully entered the cassette 17), then the timer 24 supplies an output signal that has the effect of inhibiting further operation of the system. This output signal from the timer 24, as well as being supplied to the unit 22 to result in closure of the shutter 13, is supplied to switch OFF the unit 23 and thereby break energization of the motor 26. The operation of the timer 24 to produce this output signal is inhibited however, when in the normal course of events there is actuation of the microswitch 44 before expiry of the preset period.

The signal supplied to the timer 24 and unit 22 upon actuation of the microswitch 44 is supplied to break drive from the motor 26 to the rollers 27 to 29, so that once the microswitch 44 is actuated, drive to the card ceases. The card is restrained from movement in these circumstances by virtue of the pressure of the rollers 28' and 29' holding it against the stationary rollers 28 and 29.

Operation of the timer 25, started in response to the output signal of the gating unit 20, causes illumination of a second sign on the facia 10. The sign signifies ENTER PERSONAL IDENTIFICATION NUMBER, and illumination of this directs the customer to enter his appropriate personal identification number using a set of 10 pushbuttons 45 (only two of which are shown) mounted in four rows on the facia 10. The personal identification number is in each case a decimal number of six digits. The 10 pushbuttons 45 are accordingly numbered with the 10 decimal digits 0 to 9 respectively, the six digits of the number being entered in order operating one pushbutton 45 at a time. The six-digit number entered in this way is stored in the store 43 and results in application of a signal to terminate operation of the timer 25. Termination of this operation causes illumination of the second sign to be extinguished and starts operation of a timer 46 to illuminate a third sign on the facia 10, signifying WAIT. In addition, the information that is stored in the store 43 and relates to the customer's account number and card expiry date read from the card via the tape 37, is now transmitted to the computer center shown in FIG. 3.

Figure 3:
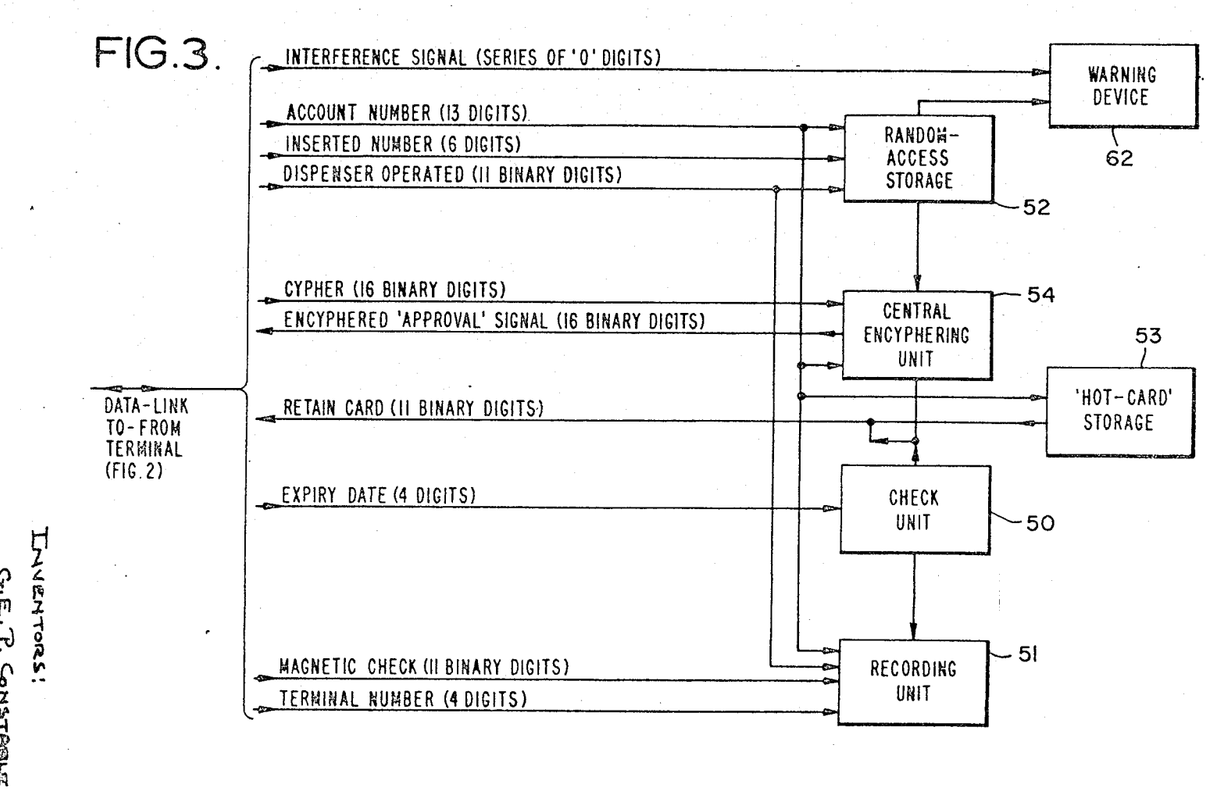
FIG. 3 is a generalized schematic representation of electronic circuit forming part of the item-dispensing system and used in conjunction with the arrangement of FIG. 2.

Referring to FIG. 3, the information from the store 43 is transmitted to the computer center together with digital representations of the signal appearing on the lead 34 and the identification number of the money-dispensing terminal involved. The information relating to the expiry date is checked in a check unit 50 at the computer center to ensure that the card is still in force, whereas the other transmitted information is recorded in a recording unit 51 for accounting and security-checking purposes. The account number is also used at the computer center to address two storage units, one a main, random-access storage-unit 52 that stores the personal identification numbers associated with the respective account numbers and details of the status of each account, and the other a so-called hoticard storage-unit 53 that stores the account numbers of customer's cards that are no longer valid (for example, cards that have been lost or stolen). The addressing of the main storage-unit 52 by the account number reveals the status of the account and the six-digit personal identification number that is to be entered by the customer using the card. The number actually entered by the customer, as stored by the store 43 (FIG. 2), is transmitted to the computer center together with a 16-digit binary cypher that is derived at the terminal by an encyphering unit 55 (FIG. 2), the entered number being supplied to the storage unit 52 and the cypher to a central encyphering unit 54. In the storage unit 52 the entered personal identification number is compared for equality with the personal identification number revealed by the account number identified from the terminal. If equality exists and the status of the account can accommodate withdrawal, a signal to this effect is passed from the unit 52 to the unit 54. (It may be useful to transmit back to the terminal from the unit 54 signals for use in giving the customer an indication of the status of his account; in particular it may be arranged that a sign on the facia 10 signifying ACCOUNT LEVEL LOW is illuminated in the event that the status of the account can accommodate only a few further transactions.)

The encyphering unit 54 transmits to the terminal a signal signifying approval of the dispensing operation, only in response to the signal from the storage unit 52 and confirmation from the check carried out by the unit 50 that the card at the terminal is still in force. This 'approval' signal is transmitted to the terminal in a form determined by the cypher received from the unit 55, and at the terminal is recognized by the unit 55. When recognized by the unit 55 the 'approval' signal causes the application of a 'dispense' signal to a gating unit 56 (FIG. 2) that receives the signal on the lead 34. The 'dispense' signal at the terminal is passed on from the unit 56 to the dispenser 21 only in the event that the signal on the lead 34 signifies that the card has satisfied the magnetic check performed using the heads 30 and 31. The dispenser 21 dispenses one packet of bank notes to the customer on reception of the 'dispense' signal and transmits a signal signifying this to the storage unit 52 at the computer center for use in debiting the customer's account. At the same time the dispenser 21 supplies a signal to terminate operation of the timer 46 and thereby extinguish the WAIT sign, and to start operation of a further timer 57.

The timer 57 after running for a few seconds, acts to causes reenergization of the solenoid 14 by switching ON the unit 22, and reengagement of the drive from the motor 26 to the rollers 27 to 29. Drive to the rollers 27 to 29 is reengaged in the reverse sense so that the card is returned along the guideway 16 to pass through the reopened shutter 13; during this reverse movement of the card the roller 28' is lifted away from the roller 28 so that no movement or imprinting of the paper tape 37 takes place (drive-pressure is maintained on the card as it passes over the roller 28 at this time by small rollers on either side of the pinch-roller 28'). A further sign on the facia 10 is at this time illuminated to signify REMOVE CARD to the customer. The full operating period of the timer 57 is such as to give the customer adequate time to remove the returned card from the mouth 11 (it may be readily arranged, however, that the period continues to run until there is in fact removal of the returned card). At the end of this full period from the sign REMOVE CARD is extinguished and a signal is passed from the timer 57 to switch OFF both units 22 and 23 so that energization of both the solenoid 14 and motor 26 ceases. The card-reception unit, and the terminal equipment as a whole, is now reset in readiness for presentation of the same or another card to the mouth 11.

It has been assumed above that the 'approval' signal is received by the cash-dispensing terminal. No such signal is sent from the computer center in the event of one or more of the circumstances in which (a) correspondence with the personal identification number stored against the account number in the unit 52 is not detected, (b) the status of the account as recorded in the unit 52 cannot accommodate a withdrawal, and (c) the unit 50 detects that the card at the terminal is no longer in force. In either of circumstances (a) and (b) the timer 46 runs for its full period; at the end of this period the sign WAIT is extinguished and the timer 57 is operated to return the card to the customer and illuminate the sign REMOVE CARD, in the same manner as described above. Another sign on the facia 10 is in this case illuminated with the sign REMOVE CARD, to signify NO DEBIT, an an electromagnetically operated hammer 58, adjacent the photoelectric reader 42, is energized to make an imprint on the paper tape 37 and thereby signify against the record of the card that the dispenser 21 has not been operated.

In circumstance (c), as with circumstances (a) and (b), no 'approval' signal is transmitted to the terminal, but in this case a signal is transmitted from the check unit 50 to a timer 59 at the terminal. The same signal is transmitted from the computer center to set the timer 59 in operation in the event that the account number transmitted to the computer center corresponds to one of the numbers stored in the hot-card storage unit 53. The timer 59 is also set in operation from within the terminal itself, in the event that the signal-condition of the lead 34 indicates that the card has not satisfied the magnetic check performed using the heads 30 and 31.

The timer 59 when set in operation acts to terminate operation of the timer 46, and after running for a few seconds acts to reengage the motor 26 to drive the rollers 27 and to 29 in the forward sense so that the card is driven from within the cassette 17 into a bin 61 at the rear of the card-reception unit; the card in the bin 61 can be retrieved by bank officials only, and not by the customer. At this time the timer 59 also energizes the electromagnetically operated hammer 58 to make an imprint on the paper tape 37 signifying that the dispenser has not been operated. In addition the timer 59 acts to illuminate the sign NO DEBIT concurrently with another sign on the facia 10 signifying CARD RETAINED. At the end of the full period of the timer 59, these two signs are extinguished and a signal is passed to switch OFF the unit 23 so that energization of the motor 26 ceases, the whole terminal equipment being now reset in readiness for presentation of another card to the mouth 11.

Provision is made at the computer center for giving warning of interference with, or malfunction of, the terminal equipment. In particular a signal is passed from the unit 52 to a warning device 62 at the computer center in the event that after an 'approval' signal has been transmitted from the unit 54 no return signal is received from the dispenser 21 to indicate that dispensing has taken place. In addition the dispenser 21 transmits a similar signal to the device 62 in the event that there is attack on, or other interference with, the equipment (in particular the dispenser 21) at the terminal. Provision may also be made for warning to be given in the event that the unit 52 detects that repeated attempts are being made with the same card to achieve operation of the dispenser 21 using experimental personal identification numbers; a signal may in these circumstances be transmitted to the timer 59 so that the card is then retained. Generally speaking there is continuous transmission of a signal-level from the terminal to the computer center such that any failure in power supply at the terminal, or communication with the center will be detected immediately.

Figure 4:
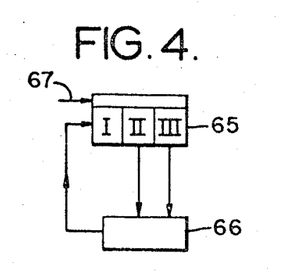
FIGS. 4 and 5 illustrate for the purposes of explaining the operation of encyphering equipment forming part of the system, alternative circuit interconnections of a shift register.
Figure 5:
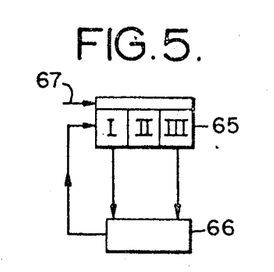

The security of the system as regards the dispensing of packets of bank notes is dependent upon the security of the 'approval' signal and the recognition of this at the terminal. The apparatus provided, both at the terminal and at the center, to achieve the encyphering and recognition of the approval signal involves a multistage shift-register used as a chain-code generator. FIGS. 4 and 5 illustrate the manner in which a shift-register 65, having in this case three bistable stages only, may be used in this respect to provide a respective chain code that varies according to the feedback connections made. In the case of the arrangement shown in FIG. 4 the outputs of the second and third stages, II and III, are added together (without carry) in a half-adder 66 to provide the feedback, whereas in the case of the arrangement shown in FIG. 5 it is the outputs of the first and third stages, I and III, that are added. The digit "0" or "1" fed back is in each case entered in the first stage of the register during the next pulse of the shift-pulse sequence on lead 67, the code sequences achieved in the two cases, starting from the condition in which each stage I, II AND III is in the "1" state, are;

| FIG. 4 | | | FIG. 5 | | |
|---|---|---|---|---|---|
| I | II | III | I | II | III |
| 0 | 1 | 1 | 0 | 1 | 1 |
| 0 | 0 | 1 | 1 | 0 | 1 |
| 1 | 0 | 0 | 0 | 1 | 0 |
| 0 | 1 | 0 | 0 | 0 | 1 |
| 1 | 0 | 1 | 1 | 0 | 0 |
| 1 | 1 | 0 | 1 | 1 | 0 |
| 1 | 1 | 1 | 1 | 1 | 1 |

In each case the register 65 is returned after seven shifts to its starting condition and so repeats the sequence recurrently. The condition of the register 65 at any particular time during operation depends upon three factors, namely, the feedback configuration, the number of shift-pulses since commencement of operation, and the particular condition that existed at commencement. It is on the basis of these three factors that encyphering of the 'approval' signal takes place, this signal being generated in both the unit 55 and the unit 54 at the terminal and computer center respectively, from the cypher derived by the unit 55. The units 55 and 54 are of substantially the same construction as one another, the only significant difference lying in the fact that the unit 55 includes comparator and cypher-generating means not provided in the unit 54. The construction of the unit 55 is shown in FIG. 6.

Figure 6:
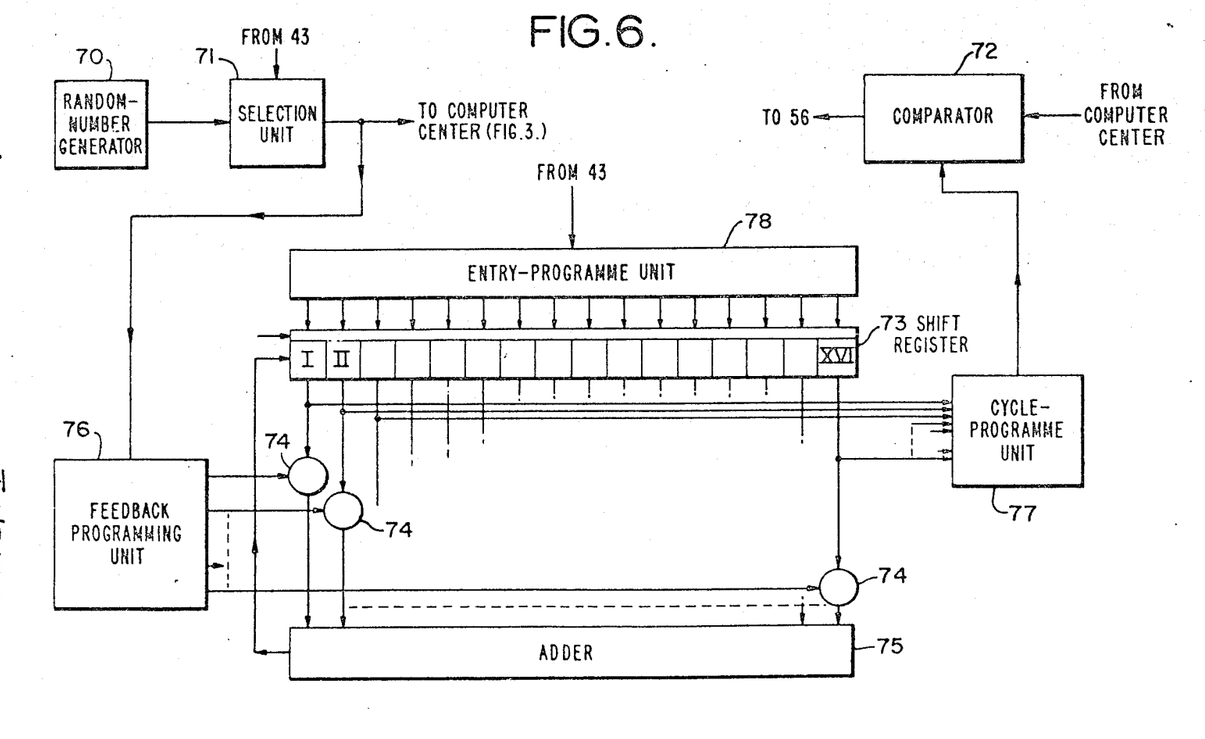
FIG. 6 is a schematic representation of encyphering equipment as used in the arrangement of FIG. 2.

Referring to FIG. 6, the cypher-generating means included in the unit 55 comprises a random-number generator 70 that generates a random sequence of 16-digit binary numbers, and a selection unit 71 that is operative to select and store temporarily whichever number is being generated at the time when entry of the personal identification number into the store 43 is completed; it is the number selected by the unit 71 that is transmitted from the unit 55 to the computer center as the 16-digit binary cypher. The comparator means in the unit 55, on the other hand, is a comparator 72 that is operative to compare the 'approval' signal received from the computer center, with a representation of a 16-digit binary number generated within the unit 55 using the cypher in conjunction with a 16-stage shift-register 73.

Each stage of the shift-register 73 is connected via an individual gate 74 to a binary adder 75. The adder 75 supplies feedback to the shift-register 73 in accordance with the least significant binary digit of the sum accumulated, so in this way there is generated through successive shifts of the register 73, a chain code dependent upon which of the gates 74 is open and which closed. The 16 gates 74 are controlled individually by a feedback-programming unit 76 in accordance with the values, "0" or "1," of the 16 binary digits of the random-number selected by the unit 71. Each individual gate 74 is controlled to be open or closed in dependence upon the value of a respective one of the 16 digits, the particular one being dependent upon the particular system of jumpering, that is to say cross-connection, effected by means of a program card (not shown) inserted in the unit 76. This program card an the random number generated, accordingly determine in conjunction with one another the particular feedback-configuration used; the same feedback-configuration is achieved in the unit 54 at the computer center by using a duplicate of the program card in the feedback-programming unit (76) there, and effecting the operation of the associated feedback gates 74 in accordance with the transmitted cypher.

A cycle-program unit 77 is responsive to the number of shifts executed by the shift-register 73 after the selection of a random number by the unit 71 and the consequent setting of the gates 74. After a programmed number of these shifts (for example, 16) the unit 77 responds to store the 16-digit binary number then held by the register 73. It is with this number that comparison of the 'approval' signal received from the computer center takes palace in the comparator 72. The 'approval' signal is in fact derived at the computer center from the cycle-program unit 77 of the encyphering unit 54, there being duplication at this cycle-program unit of the program used at the unit 77 in order that the same number of shifts are executed by the shift-register 73 there, before response of the cycle-program unit. The 16-digit number selected and stored by this latter unit provides the encyphered 'approval' signal transmitted from the center after the various checks carried out by the units 50 and 52 are satisfied, and this signal is recognized by the encyphering unit 55 at the money-dispensing terminal only if the comparison effected by the comparator 72 reveals equality of this number with the number selected and stored by the unit 77. It is only in the event of such equality that the 'approval' signal can give rise to the 'dispense' signal supplied at the terminal to the gating unit 56.

The 'approval' number is derived at the computer center from the same cypher number as the 'comparison' number selected and stored by the unit 77, using the same feedback and cycle-programs, and accordingly there can be equality between the two numbers only if the shift-registers at the terminal and center both start with the same setting. The initial setting of the shift-register 73 at the terminal is effected by an entry-program unit 78 that enters a 16-digit binary number into the register initially upon each operation of the selection unit 71. The unit 78 and the corresponding entry-program unit at the computer center, may be arranged to enter the same programmed number into their respective registers for each transaction, but it is preferred instead to make the entered number dependent upon the account number of the particular card used for the transaction. The account number as read from the imprint of the card by the photoelectric reader 42 and stored in the store 43 at the terminal, is accordingly conveyed to the unit 78 for use there in deriving the number to be entered. At the center the corresponding entry-program unit, working to the same program as the unit 78, derives the 16-digit binary number (for entry in its associated register) from the account number as transmitted from the store 43 to the unit 52.

With the form of customer's card described above with reference to FIG. 1, the pulse-recordings carried by the high-coercivity magnetic oxide of the coating 2 are masked by 'noise' recorded in the low-coercivity magnetic oxide. Although the use of magnetic-masking in this way provides an element of security it is certainly not an essential. In this latter respect, the coating 2 of the customer's card may consist of high-coercivity magnetic oxide alone, the pulse-recordings being recorded in this material and being read by the head 31 in checking the authenticity of the card, as before. Although no masking is used in these circumstances, the magnetic-recording head 30 is preferably retained and energized with alternating current as before, since this ensures that a card cannot satisfy the authenticity check unless it carries magnetic material of sufficiently high coercivity. This applies whether or not the magnetic material on the card carries pulse recordings that would otherwise satisfy the check, since the action of the head 30 is to erase any recorded signal from material having a coercivity less than the predetermined, high value.

We claim:

1. Access-control equipment for selectively enabling access to a facility, comprising first and second stations spaced apart from one another, said first station including access means operable to enable access to said facility, means for receiving a request for access, and means for transmitting information in respect of the request to said second station, and said second station including encyphering means operative to derive an encyphered word by execution of a predetermined word-deriving program, and approval means operative in dependence upon the information transmitted from said first station to transmit to said first station a signal in accordance with the encyphered word so as thereby to signify approval of the request for access, said first station further including word-deriving means operative to execute said predetermined word-deriving program at said first station for deriving the same word as derived by said encyphering means, and means for operating said access means in dependence upon recognition of the approval signal received from said second station, recognition of the approval signal in this respect being dependent upon the detection of a predetermined correspondence between the encyphered word of the approval signal and the word derived by said word-deriving means.

2. Access-control equipment according to claim 1 wherein the execution of said word-deriving program involves use of a cypher, and wherein said system includes means responsive to each said request for access to select a fresh cypher for use in respect of that request, and means for conveying the selected cypher to both said encyphering means and word-deriving means for use therein in the execution of said word-deriving program.

3. Access-control equipment according to claim 2 wherein said means for selecting a fresh cypher comprises means for generating random numbers serially, and means for selecting one of said random numbers from the series, to provide thereby the selected cypher, in response to a said request for access.

4. Access-control equipment according to claim 1 wherein said encyphering means and word-deriving means are each responsive to part at least of said information transmitted from said first station to each base execution of said word-deriving program thereon.

5. Access-control request according to claim 1 wherein said means station receiving includes for access includes means for receiving an information-bearing token, and means for deriving a plural character word from the information borne by the token, said means for transmitting information to said second station including means for transmitting this token-derived word to said second station.

6. Access-control equipment according to claim 5 wherein said first station further includes manually operable means for entering into the equipment a plural character word as part of said request for access, the particular word entered being dependent upon manual selection, said means for transmitting information to said second station including means for transmitting the manually entered word to said second station, and wherein said approval means comprising comparison means responsive to the transmitted manually entered word and token-derived word to detect whether a predetermined correspondence exists between them, and means operative to transmit said approval signal to said first station only in the event that existence of said predetermined correspondence is detected by said comparison means.

7. Access-control means according to claim 6 wherein said comparison means includes a word store for storing a multiplicity of different plural character words, and means for addressing the word store in accordance with said token-derived word to read out one of the stored words for comparison with said manually entered word.

8. Access-control equipment according to claim 1 wherein said encyphering means and said word-deriving means each comprise a multistage shift-register, a feedback arrangement controllable to operate in any selected one of a plurality of different configurations to provide feedback to the shift-register dependent upon the configuration selected, the shift-register being responsive to said feedback to generate a numerical code sequence dependent upon the selected configuration of the feedback arrangement, and means for effecting a programmed selection of a number from the generated code sequence, said equipment including means for controlling the feedback arrangements of said encyphering means and word-deriving means respectively, to operate in corresponding configurations to one another.

9. Access-control equipment according to claim 8 wherein said means for controlling the feedback arrangements includes means for generating a cypher and means for supplying the generated cypher to both said encyphering means and said word-deriving means, the encyphering means and word-deriving means each including a programmed arrangement for controlling the said feedback arrangement of that said means in accordance with the received cypher.

10. Access-control equipment according to claim 9 wherein said cypher-generating means comprises means for generating random numbers serially, and means for selecting one of said random numbers to provide the generated cypher, in response to a said request for access.

11. Access-control equipment according to claim 8 wherein said encyphering means and said word-deriving means both include an arrangement for starting operation of their individual shift-registers in response to a said request for access, this arrangement in each case including means to program the respective shift-register to start operation from an initial setting dependent upon the information transmitted to said second station in respect of the request for access.

12. Access-control equipment according to claim 1 in combination with an item-dispenser for dispensing items in response to each operation of said access means.

13. An item-dispensing system comprising two spaced stations, a first of said stations including token-reading means for receiving an information-bearing token and reading out information borne thereby, means that is operable manually for entering a number into the system, the particular number entered being dependent upon manual selection, means for transmitting to said second station the manually entered number and information read out by said token-reading means, and item-dispensing means that is selectively operable to dispense from a reserve of items at least one such item upon each operation of the item-dispensing means, and said second station including comparison means responsive to the said number and information transmitted from the first station for comparing said number with a number dependent upon said information to detect whether a predetermined correspondence exists between the two numbers, encyphering means for executing a predetermined program to derive a plural digit number, and means for transmitting said plural digit number to said first station, so as to provide a signal signifying approval of operation of the item-dispensing means, only in the event that the existence of said predetermined correspondence is detected by said comparison means, said first station also including number-deriving means for executing said predetermined program to derive at said first station the same plural digit number as derived by the encyphering means at said second station, and means for operating the item-dispensing means in response to equality between the plural digit number transmitted from the second station and the plural digit number derived at said first station.

14. An item-dispensing system according to claim 13 wherein said encyphering means and said number-deriving means each comprise a multistage shift-register, a feedback arrangement controllable to operate in any selected one of a plurality of different configurations to provide feedback to the shift-register dependent upon the configuration selected, the shift-register being responsive to said feedback to generate plural digit numbers in a code sequence that is dependent upon the selected configuration of the feedback arrangement, and means for effecting a programmed selection of one of said generated plural digit numbers, said system including means for controlling the feedback arrangements of said encyphering means and number-deriving means respectively, to operate in corresponding configurations to one another.

75